(12) United States Patent
Barr

(10) Patent No.: US 7,562,487 B2
(45) Date of Patent: Jul. 21, 2009

(54) DECOY MOVEMENT SYSTEM FOR SIMULATING LIFE-LIKE MOVEMENT OF ANIMAL SPECIES

(76) Inventor: Thomas A. Barr, 6 Meadowview Ct., Littlestown, PA (US) 17340

( * ) Notice: Subject to any disclaimer, the term of this patent is extended or adjusted under 35 U.S.C. 154(b) by 64 days.

(21) Appl. No.: 11/809,313

(22) Filed: May 31, 2007

(65) Prior Publication Data

US 2008/0295381 A1    Dec. 4, 2008

(51) Int. Cl.
*A01M 31/06* (2006.01)
(52) U.S. Cl. .............................................. 43/2
(58) Field of Classification Search ............. 43/2, 43/3
See application file for complete search history.

(56) References Cited

U.S. PATENT DOCUMENTS

| | | | | |
|---|---|---|---|---|
| 740,293 | A * | 9/1903 | Loeble | 43/3 |
| 843,588 | A * | 2/1907 | Ditto | 43/3 |
| 1,831,286 | A * | 11/1931 | Chelini | 43/3 |
| 2,536,736 | A * | 1/1951 | Gazalski | 43/3 |
| 2,663,108 | A * | 12/1953 | Dixon et al. | 43/3 |
| 4,965,953 | A * | 10/1990 | McKinney | 43/2 |
| 5,036,614 | A * | 8/1991 | Jackson | 43/3 |
| 5,289,654 | A * | 3/1994 | Denny et al. | 43/2 |
| 5,459,958 | A * | 10/1995 | Reinke | 43/2 |
| 5,515,637 | A * | 5/1996 | Johnson | 43/2 |
| 6,021,594 | A * | 2/2000 | Krueger | 43/2 |
| 6,092,322 | A * | 7/2000 | Samaras | 43/2 |
| 6,216,382 | B1 * | 4/2001 | Lindaman | 43/2 |
| 6,266,912 | B1 * | 7/2001 | Jirele | 43/2 |
| 6,374,529 | B1 * | 4/2002 | Petroski et al. | 43/3 |
| 6,487,810 | B1 * | 12/2002 | Loughman | 43/2 |
| 6,574,902 | B1 * | 6/2003 | Conger | 43/2 |
| 6,684,552 | B1 * | 2/2004 | Anders, III | 43/3 |
| 6,698,132 | B1 * | 3/2004 | Brint | 43/2 |
| 6,708,440 | B2 * | 3/2004 | Summers et al. | 43/2 |
| 6,775,943 | B2 * | 8/2004 | Loughman | 43/2 |
| 6,782,653 | B1 * | 8/2004 | Thomas | 43/3 |
| 6,834,458 | B1 * | 12/2004 | Hand et al. | 43/2 |
| 6,877,267 | B2 * | 4/2005 | Burton | 43/2 |
| 7,231,737 | B2 * | 6/2007 | Bradford | 43/2 |
| 7,272,905 | B1 * | 9/2007 | Horton et al. | 43/2 |
| 7,287,352 | B1 * | 10/2007 | Kirby | 43/2 |
| 2001/0004812 | A1 * | 6/2001 | Lindaman | 43/2 |
| 2002/0100205 | A1 * | 8/2002 | Burton | 43/2 |
| 2002/0100206 | A1 * | 8/2002 | Brint | 43/2 |
| 2003/0079397 | A1 * | 5/2003 | Brint | 43/2 |

(Continued)

*Primary Examiner*—Darren W Ark
(74) *Attorney, Agent, or Firm*—Stuart J. Friedman

(57) ABSTRACT

A decoy mounting and movement system for mounting a hollow animal species decoy and for simulating life-like movement of the animal species between a rest position and a vertically pivoted position which simulates feeding by the animal species having a decoy mounting stake formed of an elongate upper stake section and an elongate lower stake section interconnected via an elongate vertical return spring capable of bending along its length to create an angle between the upper and lower stake sections, the upper stake section dimensioned for insertion into the hollow of the decoy through an opening in its underside in communication with the hollow of the decoy, wherein the fulcrum for vertical pivoting of the decoy is positioned at the lower end of the upper stake section and the ratio D'/D is less than 0.25, wherein D' is the distance between the underside of the decoy and the fulcrum for vertical pivoting, and D is the length of the upper stake section.

5 Claims, 8 Drawing Sheets

U.S. PATENT DOCUMENTS

| | | | |
|---|---|---|---|
| 2004/0031185 A1* | 2/2004 | Summers et al. | 43/2 |
| 2004/0194365 A1* | 10/2004 | Summers et al. | 43/43.2 |
| 2004/0250461 A1* | 12/2004 | Dryer | 43/2 |
| 2005/0160654 A1* | 7/2005 | Cosciani | 43/2 |
| 2005/0204604 A1* | 9/2005 | Noles et al. | 43/2 |
| 2006/0053675 A1* | 3/2006 | Lindaman | 43/2 |
| 2006/0143968 A1* | 7/2006 | Brint et al. | 43/2 |
| 2006/0143969 A1* | 7/2006 | Lindaman | 43/2 |
| 2006/0143970 A1* | 7/2006 | Lindaman | 43/2 |
| 2007/0062093 A1* | 3/2007 | Hess | 43/2 |
| 2007/0151139 A1* | 7/2007 | O'Dell | 43/2 |
| 2007/0180754 A1* | 8/2007 | Neeley et al. | 43/3 |
| 2007/0251135 A1* | 11/2007 | Watlov et al. | 43/3 |
| 2008/0010892 A1* | 1/2008 | Goebel | 43/2 |
| 2008/0034639 A1* | 2/2008 | Abbas | 43/2 |
| 2008/0078113 A1* | 4/2008 | Denny | 43/2 |
| 2008/0172920 A1* | 7/2008 | Brint et al. | 43/2 |
| 2008/0209792 A1* | 9/2008 | Watlov | 43/2 |
| 2008/0216381 A1* | 9/2008 | Wyant | 43/2 |
| 2009/0007479 A1* | 1/2009 | Jerome, Sr. | 43/2 |

* cited by examiner

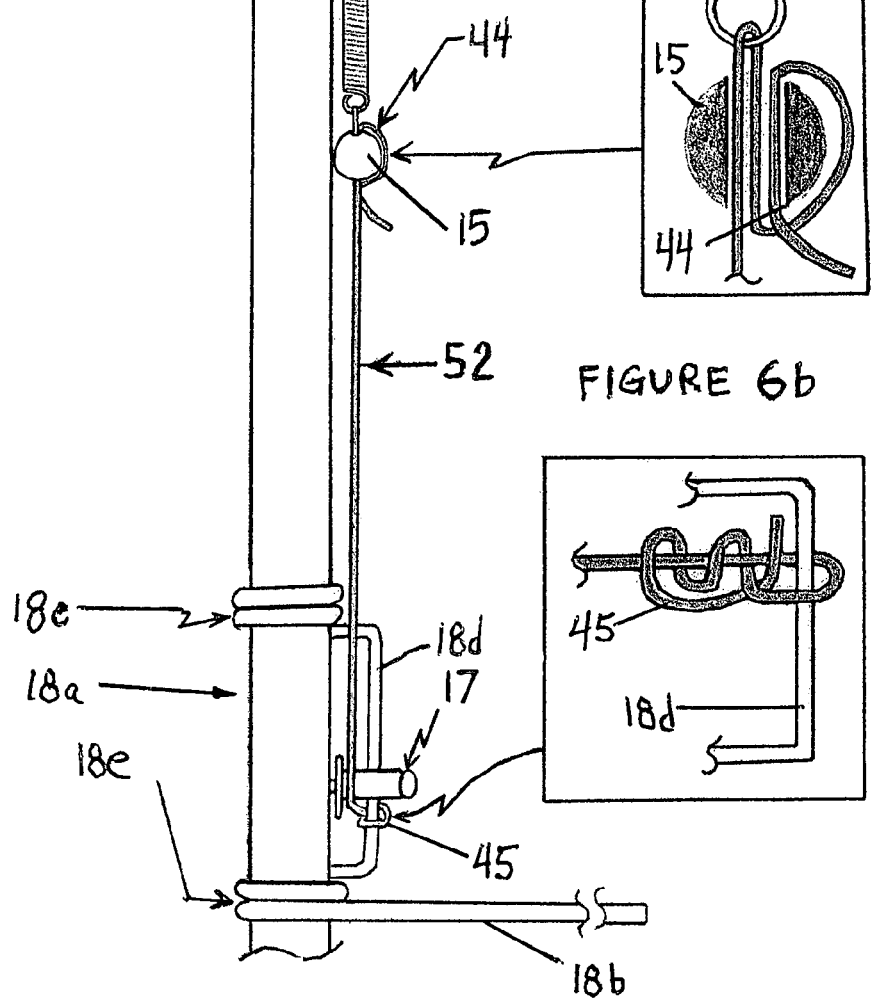
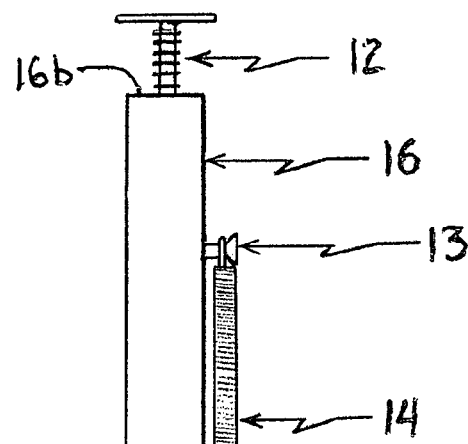
FIGURE 6
FIGURE 6a
FIGURE 6b

DECOY MOVEMENT SYSTEM FOR SIMULATING LIFE-LIKE MOVEMENT OF ANIMAL SPECIES

FIELD OF THE INVENTION

The present invention relates to an adaptable decoy movement system and, more particularly, to a decoy movement system which allows controlled movement of hollow bodied animal species decoys to simulate life-like movement of the animal species.

BACKGROUND OF THE INVENTION

Decoy mounting stakes for mounting hollow bodied animal species decoys, such as wild female turkey decoys, and which include a ground mounting stake and means for mounting an animal species decoy thereto for rotating movement of the decoy relative to the stake in response to natural, manual or mechanical applied force are well known. See, for example, U.S. Pat. No. 6,266,912-Jirele. U.S. Pat. Nos. 5,459,958 and 4,965,953-McKinney disclose a ground mounting stake for supporting a hollow animal species decoy including mechanisms which, via use of a remotely operated activator line, imparts vertical or feeding movement to the decoy. Other decoy movement systems employ wind to cause the desired decoy movement. However, experience has shown that wind movement decoys are unreliable, only moving a decoy about 20% of the time.

One well known and reasonably effective decoy system for mounting and imparting movement to hollow hen turkey decoys, which has been marketed for several years via the Internet, comprises a ground mounting stake including upper and lower sections interconnected via a vertical return spring. A rotation return spring extends longitudinally along the upper section from a point near its top. A monofilament line attached to the bottom of the return spring extends around a rivet pin protruding from the upper section at a point spaced from the top of the vertical return spring and attaches to a formed wire which has one end surrounding the upper section and the other end extending generally outwardly from the upper section for connection to the underside of the decoy. Desirably the formed wire, at the end surrounding the upper section, includes a first loop around the upper section above the protruding rivet pin, a portion extending downward from the first loop parallel to the upper section past the rivet pin and a second loop around the upper section below the protruding rivet. In this manner, as will be seen from the description of its operation hereinafter, the downwardly extending portion of the formed wire engages the protruding rivet at some point in the rotation of the formed wire about the upper section to stop rotation of the decoy.

In use, the upper section of the stake is inserted into the underside of a hollow decoy until the decoy contacts and is attached to the outwardly extending portion of the formed wire, at which point the decoy is attached to the top of the stake via a push pin or screw. A separate control line encircles the neck of the decoy, extends to a ground mounted hook screw, which is positioned under the tail of the decoy and laterally offset from the rest position of the decoy toward the decoy operator, and extends from the hook screw to a spool which can be operated to increase or decrease tension in the control line encircling the decoy's neck. Initially, there is no tension in the control line and the decoy is in its rest position. As the spool is rotated counterclockwise by the decoy operator the control line is wound upon the spool, slides through the hook screw and pulls the neck of the decoy, causing a counterclockwise rotation of the decoy. Inasmuch as the formed wire is attached to the underside of the decoy, the formed wire also rotates counterclockwise, causing the monofilament to which it is attached to pull and stretch the rotation return spring. One rotation of the spool will cause a 180° rotation of the decoy. Continued rotation of the spool causes a vertical dipping or feeding motion of the decoy as the head of the decoy is pulled toward the hook screw. This vertical motion of the decoy is permitted by the vertical return spring, which interconnects the upper and lower sections of the shaft. The vertical dipping or feeding motion places the vertical return spring under spring tension and the 180° rotation places the rotation return spring under spring tension. Operation of the spool in a clockwise direction causes the decoy to first move vertically into its 180° rotated position and then to return to its rest position, in which the downward extending portion of the formed wire engages the rivet to stop rotational motion of the decoy.

This previously marketed decoy system for imparting rotational and vertical feeding motion to an attached decoy has the shortcoming that due to its configuration, the decoy frequently bends into the vertical feeding position before the 180° rotation of the decoy is completed. Thus, an important feature of the decoy system is compromised in that the decoy operator no longer has full control over the orientation of the decoy. There exists a need for an improvement to this previously marketed device to implement its intended manner of functioning.

SUMMARY OF THE INVENTION

It is, therefore, a primary object of the present invention to provide a decoy system that can be adapted to a variety of commercially available animal species decoys to simulate life-like movements of the animal species.

It is another object of the present invention to provide a decoy system that can operate as a motionless decoy or can be transformed by a decoy operator into a life-like decoy capable of both horizontal and vertical movement anytime that it is required to do so to lure game for a hunter.

It is yet another object of the present invention to provide a decoy system which can be used on hard ground and which can be operated by a hunter with a minimum amount of movement by the user.

The foregoing and other objects are achieved in accordance with the present invention by providing an improved version of a previously marketed device wherein maintenance of the relative dimensions of components of the decoy system can avoid unwanted and untimely vertical motion of the decoy and provide the user with full control over the movements of the decoy.

In another aspect of the present invention, unwanted vertical movement and full control over the movements of the decoy can be assured by controlling the ratio of (1) the length of the upper stake section between the fulcrum of the vertical return spring and the bottom of the formed wire where it contacts the underside of the decoy, to (2) the length of the upper stake section between the fulcrum of the vertical return spring and the top of the stake, to a value less than 0.25, preferably in the range of 0.15 to 0.20.

BRIEF DESCRIPTION OF THE DRAWINGS

FIG. 6 is a front elevational view showing the structural inter-relationship of the components mounted to the upper shaft section.

FIG. 6a is a magnified front elevational view of the connection between the rotation return spring and the monofilament line.

FIG. 6b is a magnified front elevational view of the connection between the formed wire and the monofilament line.

DESCRIPTION OF THE PREFERRED EMBODIMENT

Figure 1:
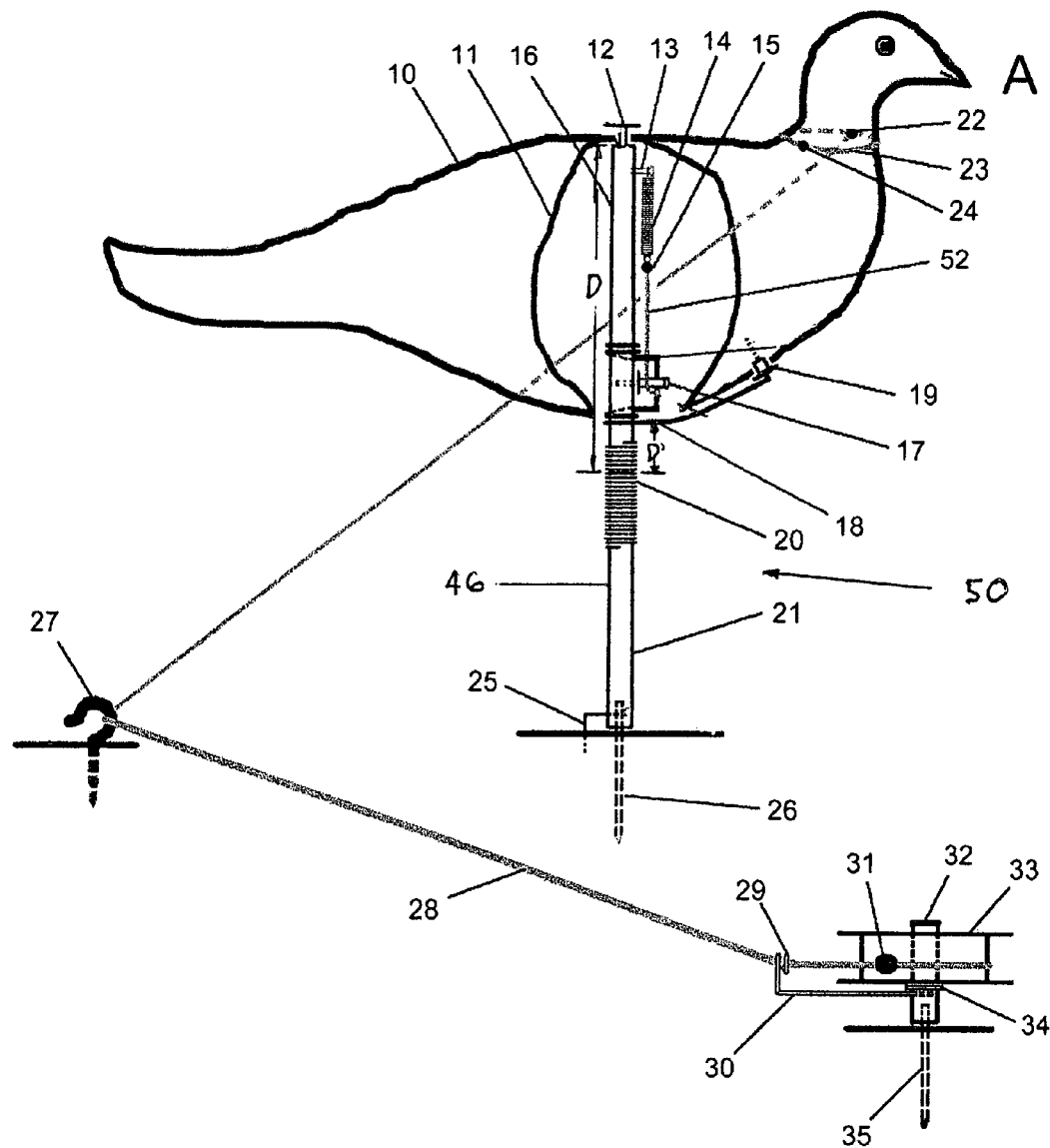
FIG. 1 is a front elevational view of the decoy system of the present invention with the decoy in the rest position.
Figure 2:
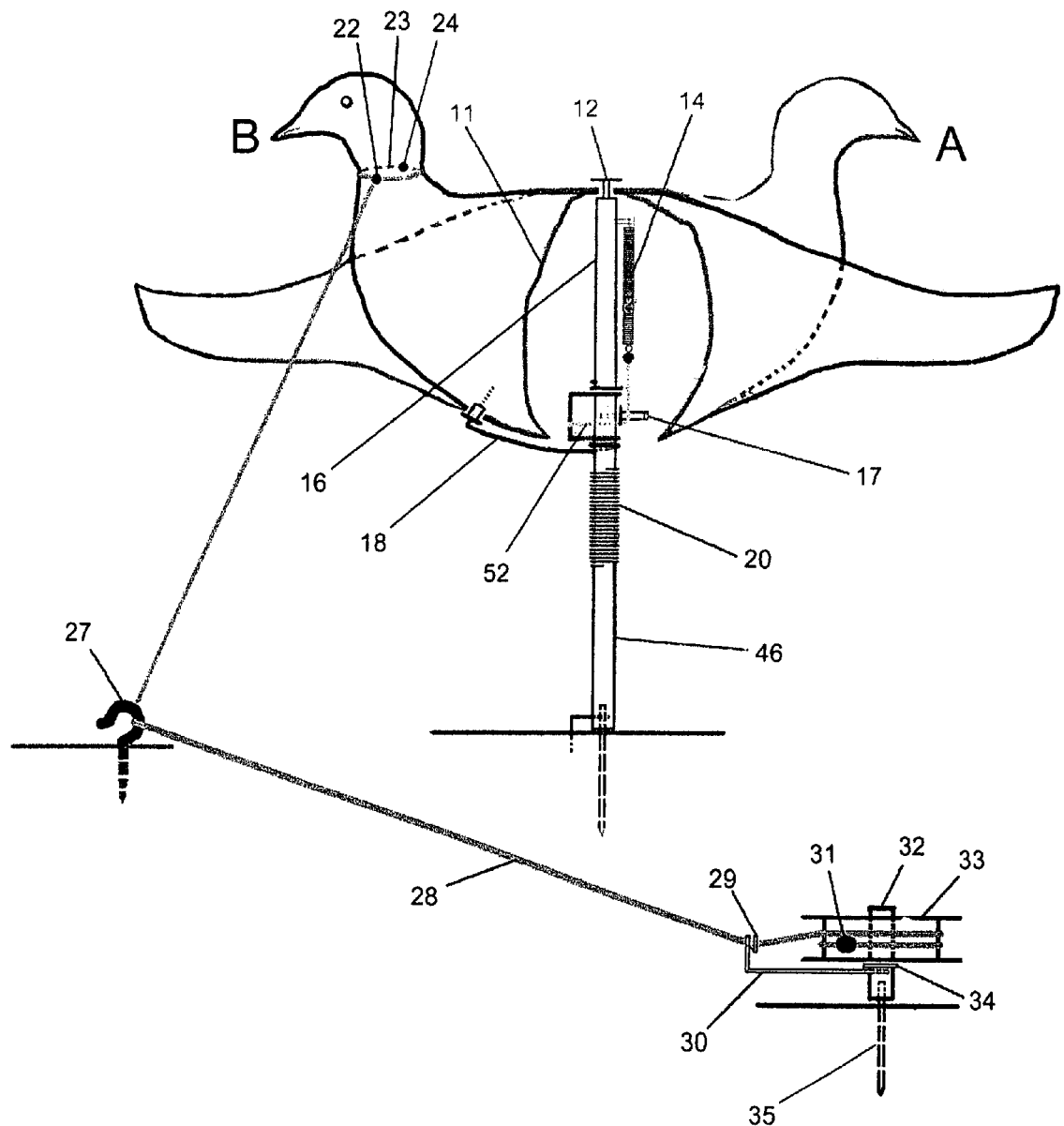
FIG. 2 is a front elevational view of the decoy system of the present invention with the decoy in the 180° rotated position.
Figure 3:
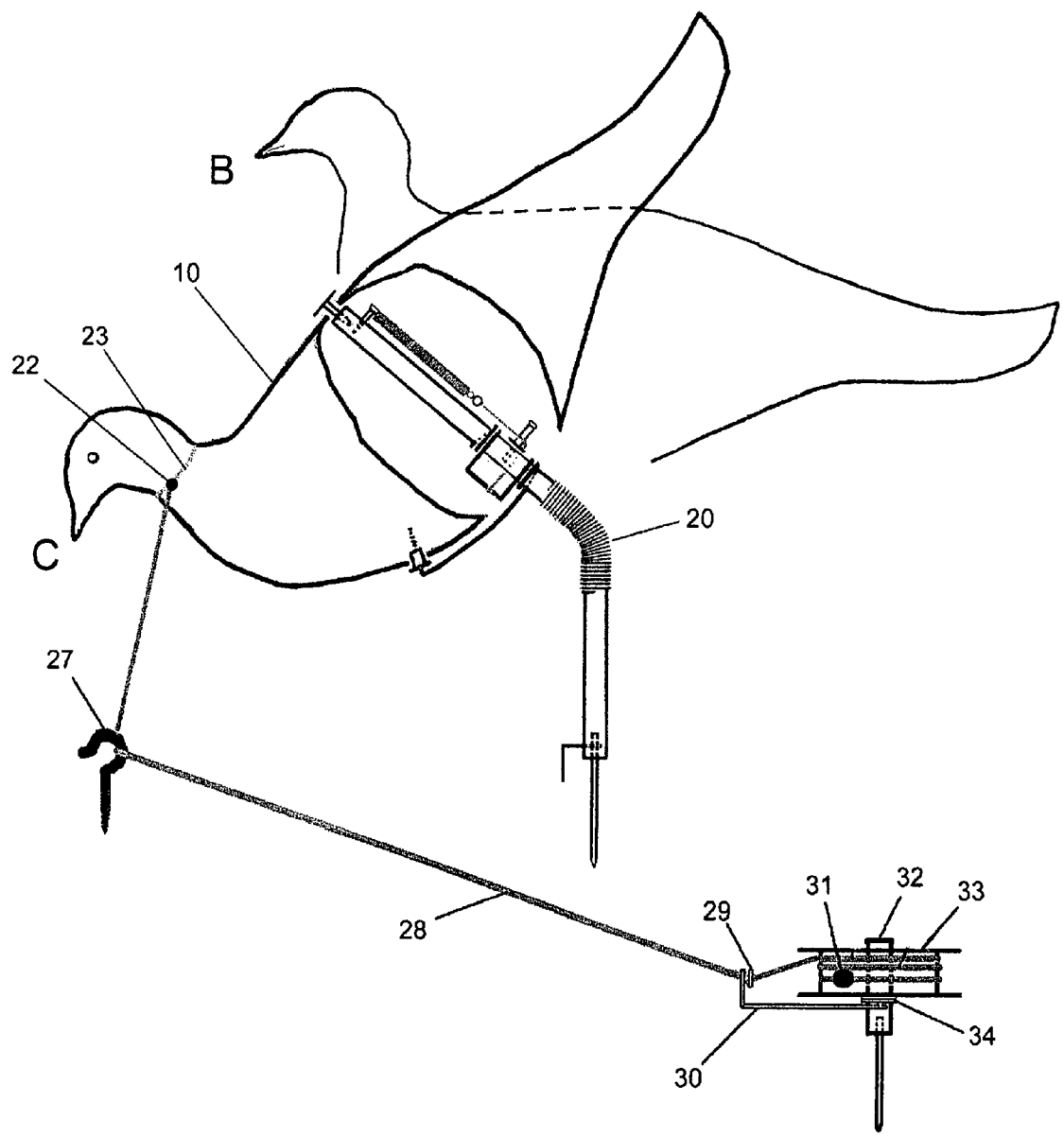
FIG. 3 is a front elevational view of the decoy system of the present invention with the decoy in the 180° rotated position and in the vertical feeding position.

Referring first to FIGS. 1-3, there is shown an embodiment of the decoy system 50 of the present invention, which is adapted to be inserted into the ground and to mount any one of a variety of hollow animal species decoys 10. The specific decoy 10 shown in the Figures is a hen turkey decoy intended to be used to lure tom turkeys within shooting range for hunting purposes. However, the invention is not limited to any particular species or design of decoy so long as the decoy is hollow bodied or can be adapted or modified to be sufficiently hollow bodied to allow the operational features of the present invention to function within the body of the decoy.

Figure 7:
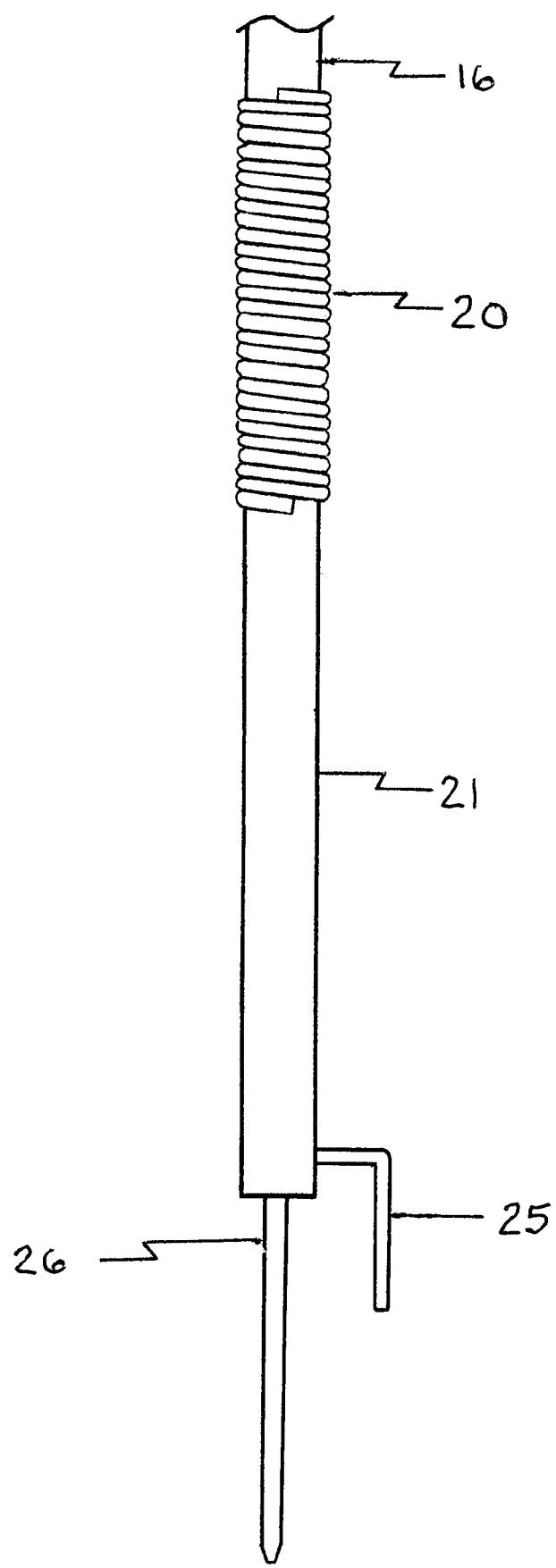
FIG. 7 is a front elevational view of the lower shaft section interconnected via the vertical return spring to the upper shaft section.
Figure 8:
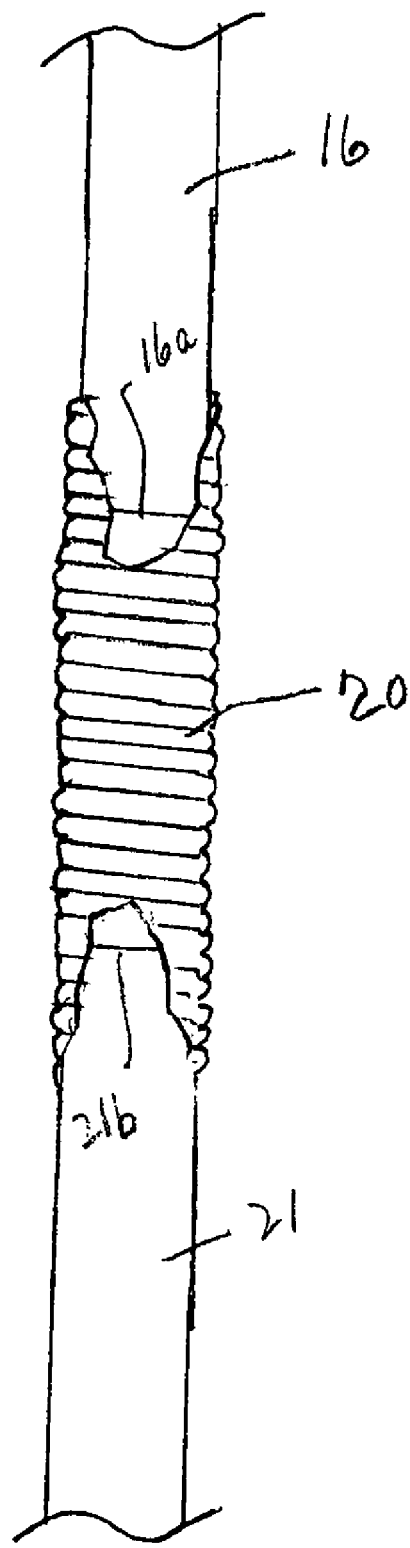
FIG. 8 is a partially cut away view showing the structural interconnection between the vertical return spring and the upper and lower shaft sections.
Figure 9:
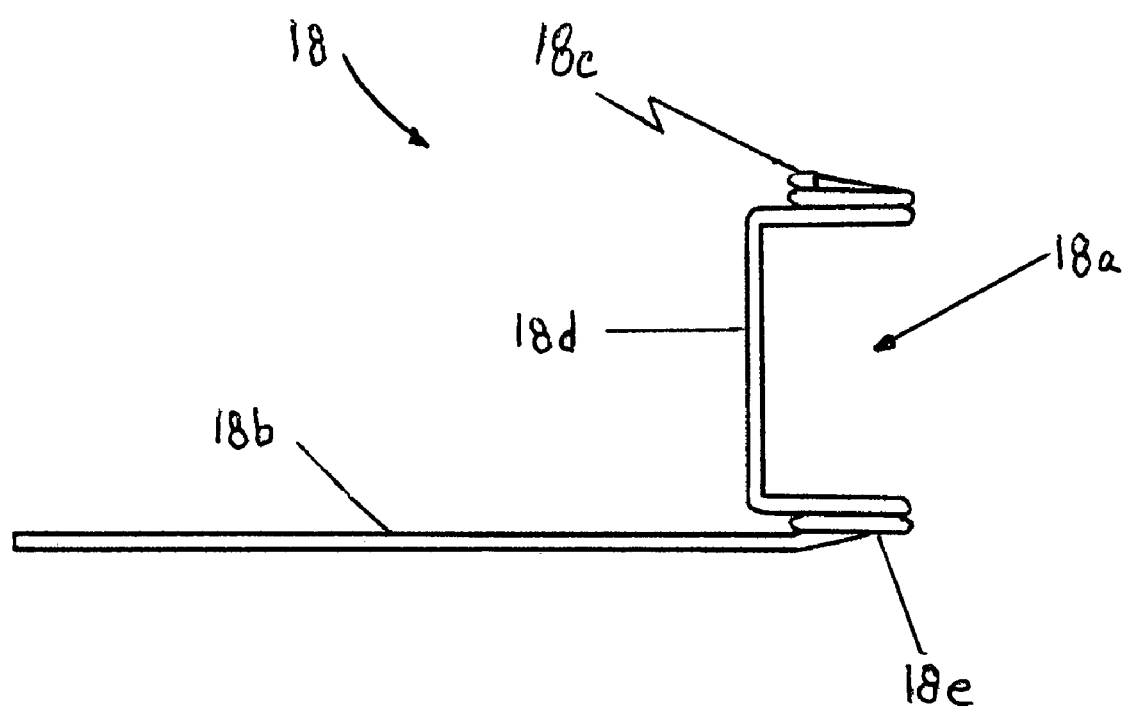
FIG. 9 is a front elevational view of the formed wire of the present invention.

The decoy system 50 includes a decoy mounting stake 46 comprising an upper stake section 16 and a lower stake section 21. At the lower end of the bottom stake section there is provided a mounting stake nail 26 which is used to penetrate the ground and to support the stake 46 and mounted decoy 10. An L-shaped torque spike 25 has an extender portion extending from the lower end of lower stake section 21 generally parallel to the ground and a ground engaging portion to prevent turning of stake 46 when the decoy 10 mounted thereon is caused to rotate. Upper stake section 16 and lower stake section 21 are interconnected via vertical return spring 20, into the ends of which the respective contiguous ends 16a and 21b of the upper and lower stake sections are inserted (as can be more clearly seen in FIGS. 7 and 8).

Figure 5:
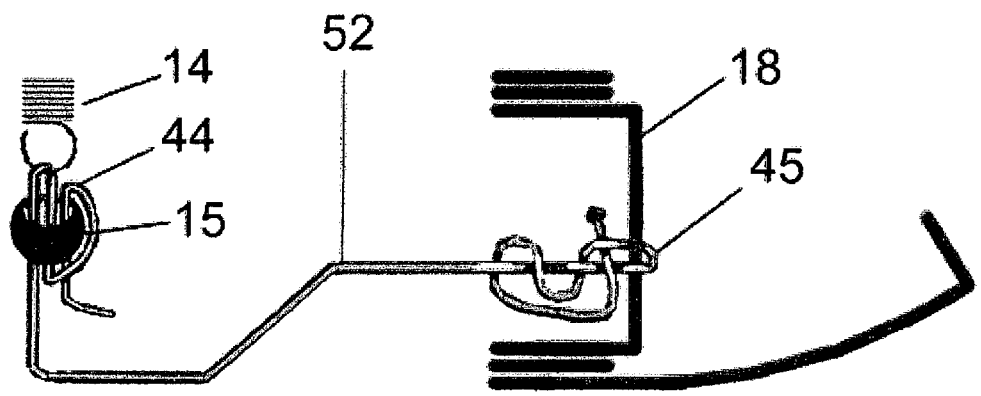
FIG. 5 is a schematic view showing the functional relationship between the formed wire, the rotation return spring and the monofilament line.

Referring to FIGS. 1-3 and 6, a rotation return spring 14 extends longitudinally downwardly along and generally parallel to the upper stake section 16 from a point near, but below, (about 1 inch below) the top 16b of the upper stake section 16, where spring 14 is attached at its upper end, e.g., via a screw 13. A strong, flexible monofilament line 52, such as a 60 lb. test line, is attached to the lower end of the rotation return spring and extends around a rivet pin 17 protruding from the upper stake section 16 at a point spaced above the top of the vertical return spring 20. Preferably, monofilament line 52 is attached to the lower end of the rotation return spring via a bead 15 having an aperture therethrough and a secure knot 44 (see FIGS. 5 and 6a) to permit easy adjustment of the length of the monofilament line 52. The other end of monofilament line 52 attaches to a formed wire 18 via secure knot 45 (see FIGS. 5 and 6b). Formed wire 18 has one end 18a surrounding the upper stake section 16 and the other end 18b extending generally outwardly from the upper stake section 16 for connection to the underside of the decoy 10. Desirably the formed wire 18, at the end 18a surrounding the upper stake section 16, includes a first loop 18c around the upper stake section 16 above the protruding rivet pin 17, a portion 18d extending downward from the first loop 18c, past the protruding rivet pin 17, and generally parallel to the upper stake section 16, and a second loop 18e around the upper stake section 16 below the protruding rivet pin 17 (see FIGS. 1-3 and 9). In this manner, as will be seen from the description of operation hereinafter, the downwardly extending portion 18d of the formed wire 18 engages the protruding rivet pin 17 at some point in the rotation of the formed wire 18 about the upper stake section 16 and rivet pin 17 serves as a stop.

Figure 4:
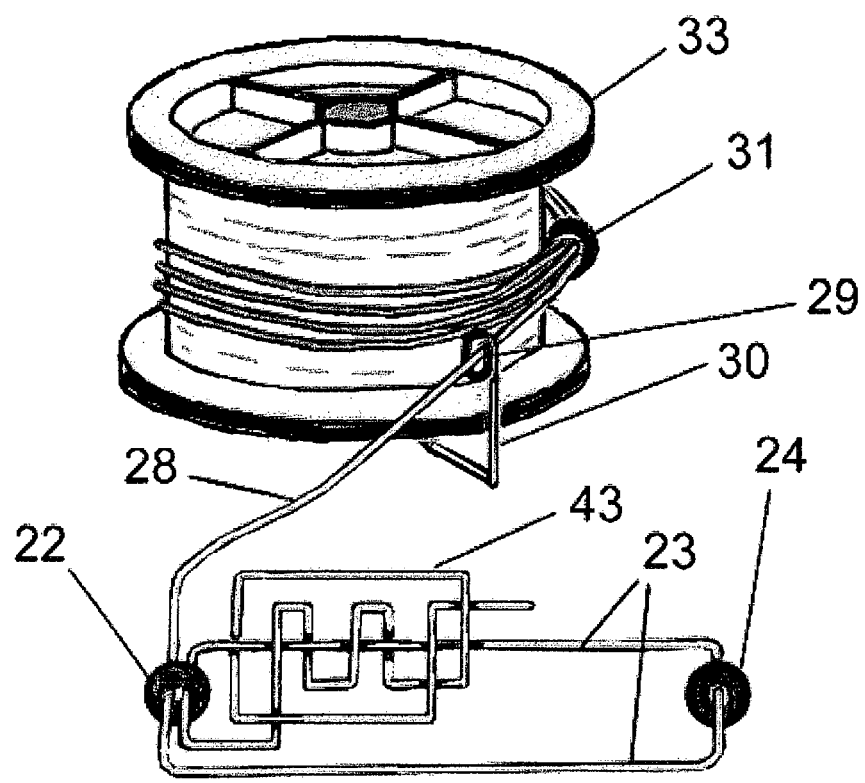
FIG. 4 is a perspective view of the spool and the control line.

In use, the upper section 16 of the stake 46 is inserted into the underside of the hollow 11 of decoy 10 until the top 16b is adjacent the upper end of the hollow decoy body and the underside of decoy 10 contacts and is attached, e.g., via a grommet 19, to the outwardly extending portion 18b of the formed wire 18. At this time threaded top pin 12 is inserted through an opening in the top of decoy 10 into the top end 16b of upper stake portion 16 and is threaded down sufficiently to securely mount the decoy 10 between the outwardly extending portion 18b of the formed wire and top pin 12 without interfering with the ability of the decoy 10 to swivel about stake 46. A separate monofilament control line 28, e.g., about 14 lb. test, is formed into a loop 23 which encircles the neck of the decoy 10, extends to a ground mounted hook screw 27 which is positioned under the decoy's tail in the rest position of the decoy 10 (as shown in FIG. 1), and laterally offset toward the decoy operator, and extends from the hook screw to a spool 33 which can be operated to increase or decrease tension in the control line 28 encircling the neck of the decoy 10. Referring to FIG. 4, the loop 23 which encircles the neck of the decoy 10 is formed at one end of control line 28 using a bead 22 having an aperture therein and forming a multiple turn firm knot 43 to secure the end of control line 28 to bead 22. A second bead 24 having an aperture therein is used to prevent loop 23 from getting too tight and knotting when the control line 28 is not attached to the neck of the decoy 10.

The other end of the control line 28 is secured to spool 33 by passing multiple, e.g., five, loops of the monofilament through the aperture in bead 31. The five loops prevent the control line 28 from unwrapping from spool 33 when unattended and provide a locking mechanism when the user wants to lock decoy 10 at some point of its 180° rotation. Referring to FIG. 4, line guide loop 29 of line guide 30 provides a feeding point to spool 33. The spool 33 is maintained in position at the location of the decoy operator via spool stake 32, which is inserted through a central aperture in spool 33, and spool stake spike 35 which is secured to spool stake 32 and pushed into the ground. It is desirable to insert a plastic washer 34 on spool stake 32 under stool 33 to provide minimum friction on the spool when being rotated to increase or decrease tension in control line 28.

Initially, there is no tension in the control line 28 and the decoy 10 is in its rest position, as shown in FIG. 1, facing in direction A. As the spool 33 is rotated clockwise or counter-clockwise by the decoy operator to increase tension in control line 28 (counterclockwise in FIGS. 1-3), the control line 28 passes through guide loop 29 on line guide 30 and is wound upon the spool, slides through the hook screw 27 and pulls the neck of the decoy 10, causing a counterclockwise rotation of the decoy 10, as shown in FIG. 2, facing in direction B.

Inasmuch as formed wire 18 is attached to the underside of the decoy, the formed wire 18 also rotates counterclockwise, causing the monofilament 52 to which it is attached to pull and stretch the rotation return spring 14. One rotation of the spool 33 will cause a 180° rotation of the decoy 10. Continued rotation of the spool 33 causes a vertical pivoting motion of the decoy 10 as the head of the decoy 10 is pulled toward the hook screw 27, simulating feeding or grazing by the animal species, as shown in FIG. 3, facing in direction C. This vertical motion of the decoy 10 is permitted by the vertical return spring 20, which interconnects the upper 16 and lower 21 sections of the stake 46. The vertical pivoting motion places the vertical return spring 20 under spring tension and the 180° rotation places the rotation return spring 14 under bending and spring tension. Operation of the spool 33 in the opposite direction (clockwise in FIGS. 1-3) causes the decoy 10 to first move vertically into its 180° rotated position (FIG. 2) and then to return to its rest position (FIG. 1), in which the downward extending portion 18d of the formed wire 18 engages the rivet pin 17 to stop rotational motion of the decoy 10.

The decoy system of the present invention is particularly advantageous and is an improvement over the previously marketed decoy system because it allows complete user control of the position and movement of the decoy 10. The decoy 10 does not, as was the case with the prior art decoy system, tend to move vertically into the feeding position as the control line 28 attempts to rotate it from a position facing in direction A (FIG. 1) to direction B (FIG. 2). This improvement was accomplished by controlling the distance between the fulcrum for vertical rotation of vertical return spring 20, which is the lower end 16a of the upper stake section 16, and the bottom of the formed wire 18b where it contacts the underside of the decoy 10. When control line 28 is wound upon spool 33, both a rotating force and a downward force are applied to the neck of the decoy 10. The force tending to cause vertical feeding motion acts along the upper stake 16 between the top 16b of the upper stake section and the pivot or bending point of the upper stake section 16 and vertical return spring 20 (hereinafter called the fulcrum of the vertical return spring 20), which is at the lower end 16a of the upper stake section 16 (length=D). By reducing the distance between the bottom of the decoy and the fulcrum of vertical return spring 20 (length=D'), the tendency for the decoy to move vertically toward the feeding position, while rotating, is reduced. The ratio D'/D represents the percentage of the length of the upper stake section 16 which is below formed wire portion 18b. It is desirable for this ratio to be small in order to minimize the moment arm upon which the downward force may act. It has been found that a decoy system wherein the ratio D'/D is less than about 0.25 allows complete user control of the position and movement of the decoy without tendency for the decoy to move vertically while rotating. Most preferably, the ratio D'/D is in the range 0.15-0.20.

While the present invention has been described in terms of specific embodiments thereof, it will be understood that no limitations are intended to the details of construction or design or practice of the invention other than as defined in the appended claims.

The invention claimed is:

1. In a decoy mounting and movement system for mounting a hollow animal species decoy and for simulating life-like movement of the animal species, under the control of a decoy operator, between a rest position and at least two other positions, said decoy having a neck mounted head and a tail at opposite ends of a body, said body having a top side, an underside and an opening in the underside communicating with the hollow in the decoy, said system including:

a decoy mounting stake comprising an elongate upper stake section having an upper end, a lower end and a length, and an elongate lower stake section, said elongate upper stake section and said elongate lower stake section being interconnected via an elongate vertical return spring means capable of bending about a fulcrum located intermediate a length of said elongate vertical return spring means to create an angle between the upper and lower stake sections, the lower stake section including ground penetrating means for embedding in the ground to securely support said mounting stake in the ground, said upper stake section dimensioned for insertion into the hollow of said decoy through the opening in its underside, and pin means pivotally securing the top side of the decoy body to the upper end of said upper stake section when the upper stake section is with the hollow of the decoy;

elongate rotation return spring means having an upper end and a lower end, said rotation return spring means being both supported at its upper end and extending longitudinally downwardly along said upper stake section from a point below the upper end of the upper stake section, one end of flexible line means being attached to the lower end of sad rotation return spring means, extending downwardly along and generally parallel to said upper stake section and bending around a protrusion mounted on the upper stake section, the other end of said flexible line means being attached to a vertically extending intermediate portion of a formed wire, said formed wire having one end surrounding said upper stake section for allowing rotation of said formed wire therearbout and the other end of said formed wire connected to the underside of said decoy;

a control line having one end attached to the neck of the decoy, the other end of the control line passing around a ground mounted pivot means, said pivot means adapted to be positioned under the tail of the decoy in its rest position and offset towards the decoy operator, and controlled by the decoy operator for moving said decoy between its rest and at least two other positions;

whereby an application of tension in the control line by the decoy operator initially causes the decoy to rotate about 180° from its rest position about said decoy mounting stake to a second position, which rotation places the rotation return spring under spring tension, and the application of increased tension in the control line by the decoy operator causes the decoy to pivot vertically about said fulcrum into a third position simulating feeding or grazing by the animal species, which vertical pivoting places the vertical return spring under bending and spring tension and, upon release of the tension in the control line, the decoy moves between its third position and its second position and, with continued release of the tension in the control line, moves between its second position and its rest position;

the improvement comprising:

said fulcrum about which said decoy vertically pivots being located at the lower end of the upper stake section; and wherein a ratio D'/D is less than 0.25, wherein D' is distance between the underside of decoy and said fulcrum about which said decoy vertically pivots, and D is the length of upper stake section.

2. In a decoy mounting and movement system, as claimed in claim 1, wherein the ratio D'/D is in the range 0.15 to 0.2.

3. In a decoy mounting and movement system, as claimed in claim 1, wherein the other end of the control line is secured to a spool and the spool is controlled by the decoy operator.

4. In a decoy mounting and movement system, as claimed in claim 3, wherein the spool is staked to the ground in a manner permitting rotation of the spool about said stake.

5. In a decoy mounting and movement system, as claimed in claim 1, including the protrusion mounted on the upper stake section which engaged the vertically extending intermediate portion of said formed wire in the rest position of said decoy.

* * * * *